(12) United States Patent
Murphy et al.

(10) Patent No.: US 11,515,940 B2
(45) Date of Patent: Nov. 29, 2022

(54) TEST DEVICE FOR VERIFYING OPERATION OF AN OPTICAL FIBER MONITORING SYSTEM

(71) Applicant: Network Integrity Systems, Inc., Hickory, NC (US)

(72) Inventors: Cary R. Murphy, Hickory, NC (US); Dave Eric Cunningham, Conover, NC (US); Mark K Bridges, Hickory, NC (US); Daniel M. Goertzen, Winnipeg (CA); Matthew R. Friede, Greenville, SC (US); Andrew V. Pasterczyk, Jr., Virginia Beach, VA (US); Darrell J. Magee, III, Yorktown, VA (US)

(73) Assignee: Network Integrity Systems, Inc., Hickory, NC (US)

( * ) Notice: Subject to any disclaimer, the term of this patent is extended or adjusted under 35 U.S.C. 154(b) by 0 days.

(21) Appl. No.: 17/018,535

(22) Filed: Sep. 11, 2020

(65) Prior Publication Data

US 2022/0085879 A1 Mar. 17, 2022

(51) Int. Cl.
*H04B 17/00* (2015.01)
*H04B 10/079* (2013.01)

(52) U.S. Cl.
CPC .............. *H04B 10/0795* (2013.01)

(58) Field of Classification Search
CPC .................. H04B 10/0795
USPC ........................................ 398/28
See application file for complete search history.

(56) References Cited

U.S. PATENT DOCUMENTS

| | | | | |
|---|---|---|---|---|
| 5,384,635 A | * | 1/1995 | Cohen | G01S 7/499 356/73.1 |
| 5,703,682 A | * | 12/1997 | Eslambolchi | H04B 10/079 356/73.1 |
| 7,142,737 B1 | | 11/2006 | Murphy | |
| 7,706,641 B2 | | 4/2010 | Murphy | |
| 9,621,262 B1 | | 4/2017 | Timmins | |
| 2005/0254038 A1 | * | 11/2005 | Harres | G01M 11/083 356/73.1 |
| 2007/0086694 A1 | | 4/2007 | Murphy | |

(Continued)

FOREIGN PATENT DOCUMENTS

CN 103926061 7/2014
CN 104240455 12/2014

(Continued)

*Primary Examiner* — Mohammad R Sedighian
(74) *Attorney, Agent, or Firm* — Adrian D. Battison; Ade & Company Inc.; Ryan W. Dupuis

(57) ABSTRACT

In an optical fiber monitoring system which detects physical disturbance or other parameters such as temperature or strain of a fiber where a monitor signal is transmitted along the optical fiber and analyzed to detect changes which are indicative of an event, a method is provided for periodically checking proper operation of the optical fiber monitoring system. A fiber disturbance actuator periodically causes a pattern of disturbances of a portion of the fiber at a predetermined location thereon where the disturbance is characteristic of the event to be monitored. The monitor signal is analyzed to detect the pattern of changes and in the event that expected changes are not detected, a warning is issued that the intrusion detection system is not properly operating.

26 Claims, 11 Drawing Sheets

(56) References Cited

U.S. PATENT DOCUMENTS

| | | | |
|---|---|---|---|
| 2010/0284000 A1* | 11/2010 | Xu | G01D 5/35358 |
| | | | 356/301 |
| 2013/0188177 A1 | 7/2013 | Lovely | |
| 2014/0368809 A1 | 12/2014 | Chen | |
| 2016/0327436 A1* | 11/2016 | Tur | G01K 11/32 |
| 2017/0067335 A1* | 3/2017 | Weng | E21B 47/10 |
| 2018/0292240 A1* | 10/2018 | Liu | G08B 13/186 |
| 2019/0074896 A1 | 3/2019 | Murphy | |
| 2021/0278314 A1* | 9/2021 | Xia | G01M 11/088 |

FOREIGN PATENT DOCUMENTS

| | | |
|---|---|---|
| GB | 2317008 | 3/1998 |
| JP | 2007121090 | 5/2007 |
| JP | 2009014546 | 1/2009 |
| JP | 2018048917 | 3/2018 |
| KR | 20090087590 | 8/2009 |
| KR | 101574198 | 12/2015 |
| WO | WO2005010562 | 2/2005 |
| WO | WO2014035303 | 3/2014 |

* cited by examiner

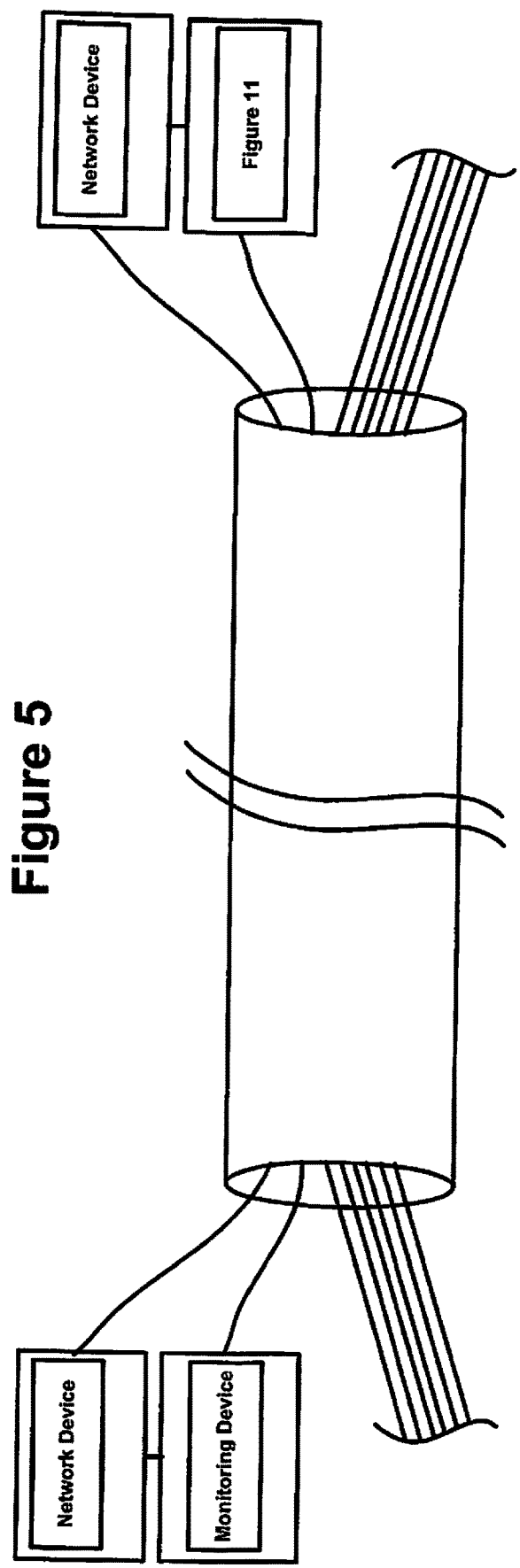

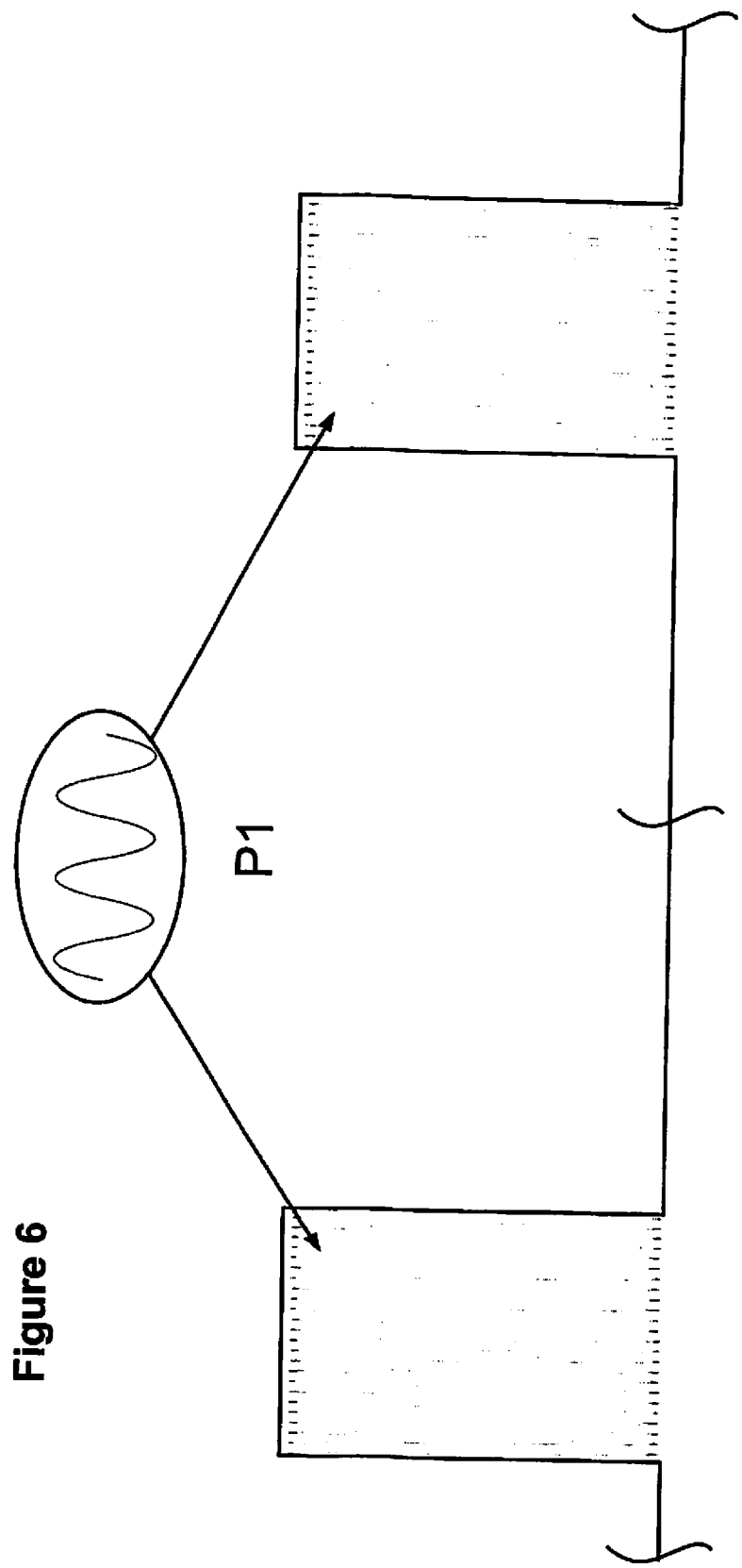

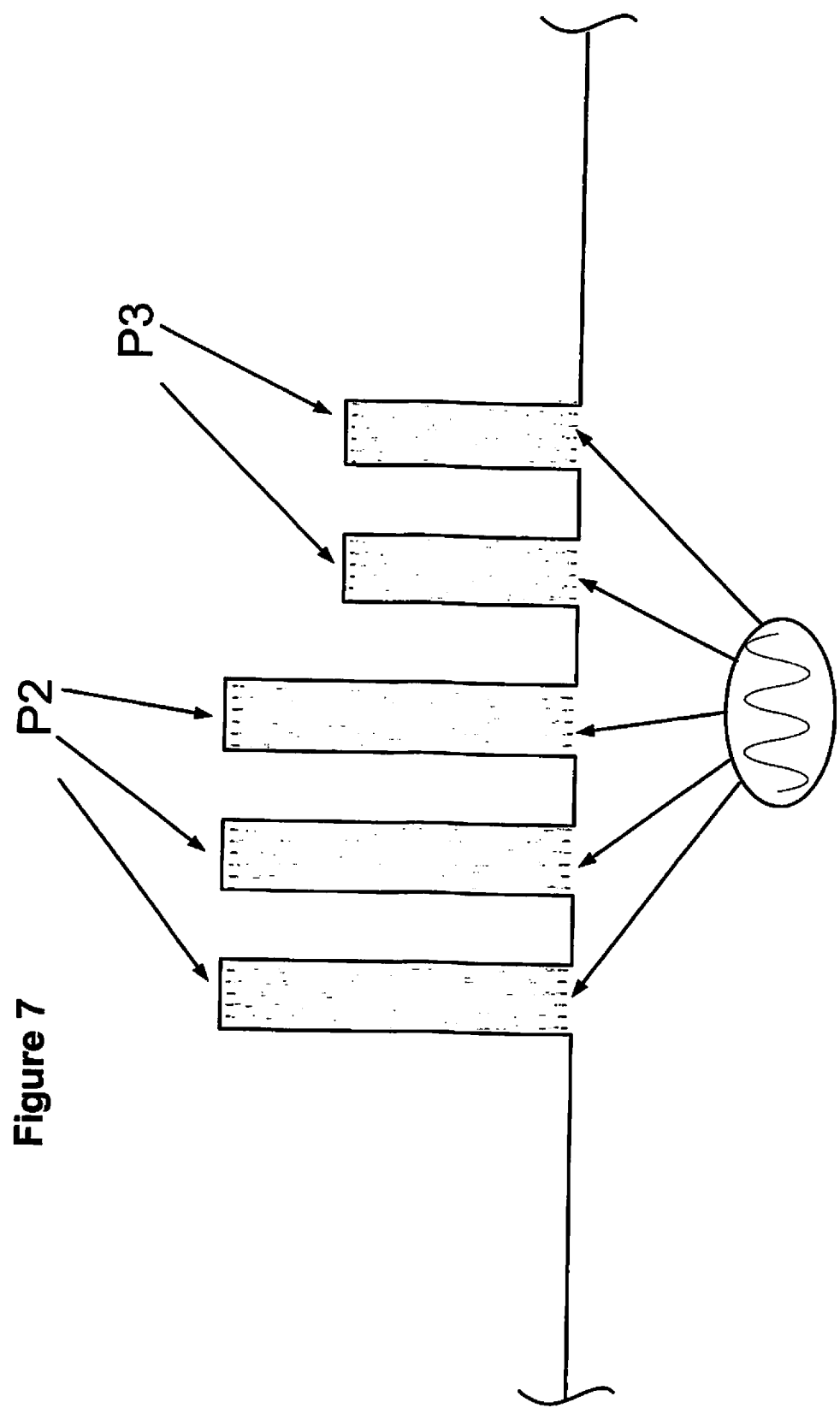

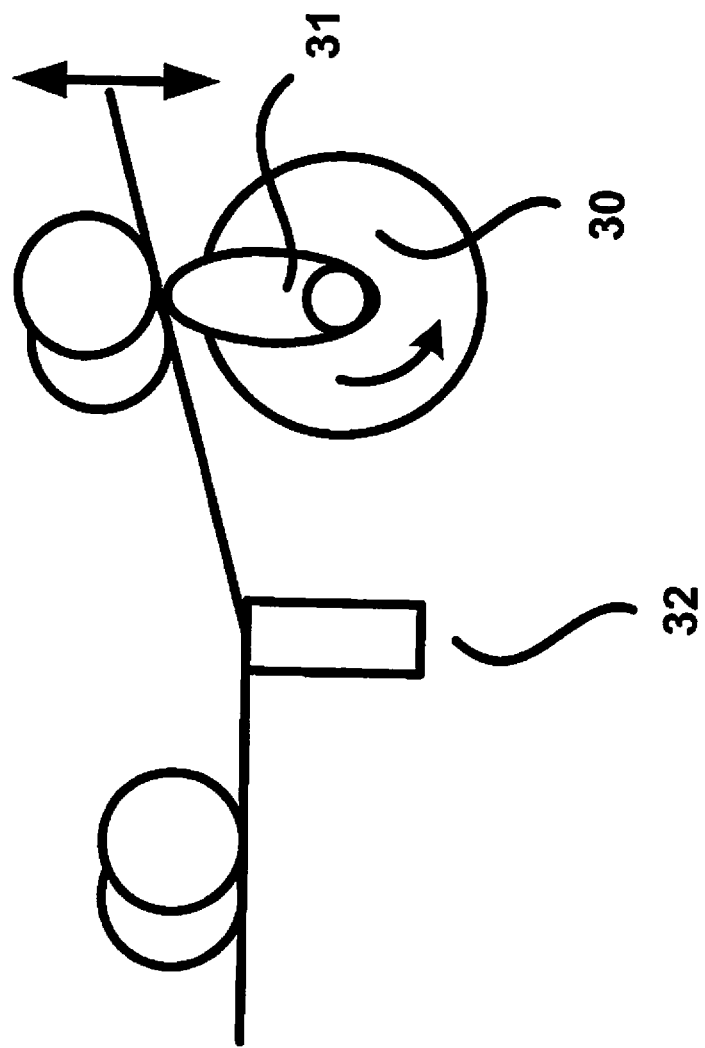

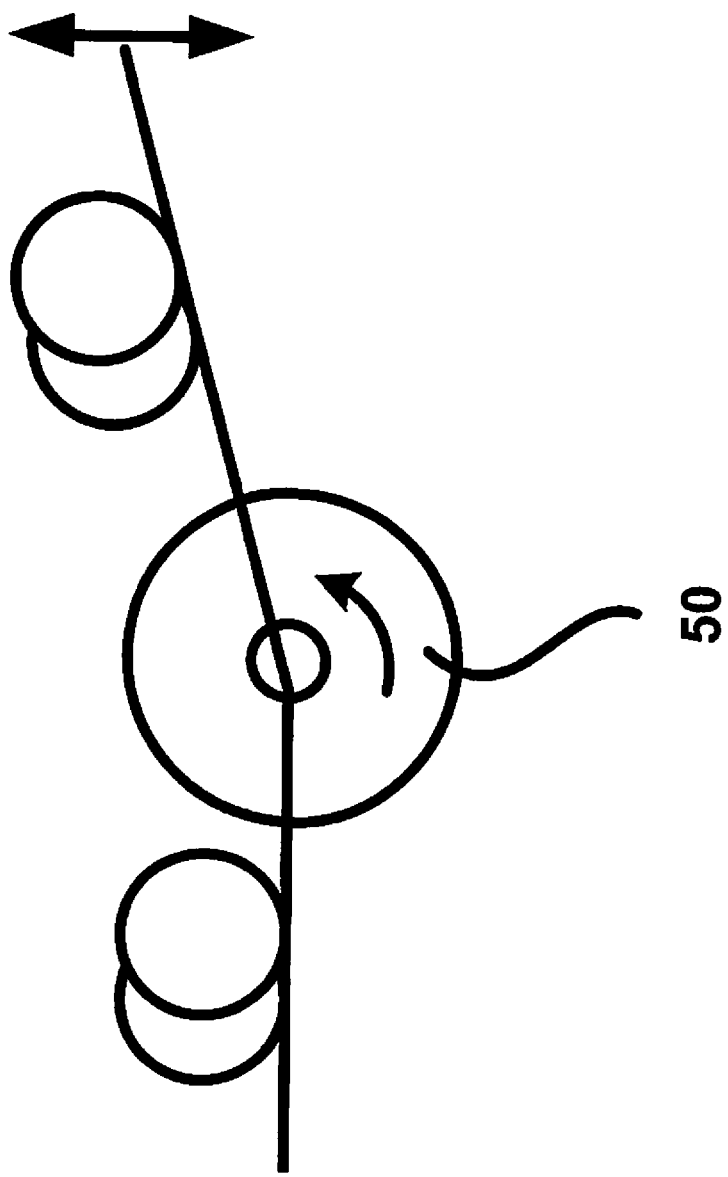

TEST DEVICE FOR VERIFYING OPERATION OF AN OPTICAL FIBER MONITORING SYSTEM

This application relates to a test device for periodically, or on demand, checking and verifying proper operation of a monitoring system of an optical fiber.

BACKGROUND OF THE INVENTION

Optical fiber is used for many types of monitoring applications, including but not limited to perimeter security, network security, structural monitoring.

Typically the fiber concerned is monitored using a method which includes transmitting from a source of light at a transmit location a monitor signal along the optical fiber, receiving the monitor signal after transmission along the fiber, analyzing the monitor signal after transmission along the fiber to detect changes therein and generating an alarm in response to the detected changes.

In regard to communications networks, the monitor system is responsive to vibration, motion, or handling of the fiber which are indicative of an intrusion attempt on the fiber.

In addition, the invention herein can be used for fence and buried perimeter protection systems where a fiber is mounted on or at the item to be secured so that again the fiber is monitored for vibration or motion of the fiber caused by attempts to access or penetrate the item concerned.

Yet further, the invention herein can be used for other fibers used for monitoring forces on the fiber caused by strain or other forces that monitor bridge or building integrity. These can include stretching or compression of the fiber. In this case the monitor Is not looking for transverse vibration or movement of the fiber from an intrusion attempt or other handling but is instead looking for changes in the character of the fiber caused by the application of the forces to the fiber. Such arrangement can be used in strain gauges, building and bridge monitoring systems and the like.

Additionally, the invention herein can be used to monitor temperature, strain, and pressure using sensors in wells and down-hole applications. Such methods require a looped fiber to accommodate the inability to place equipment in wells or down holes.

Additionally, the invention herein can be used to monitor fibers distributed throughout a so-called 'smart city" type application. In these instances, fibers are distributed to monitor traffic patterns, weather, electrical distribution, and seismic activity.

In all cases the change in the parameter to be measured causes a change in a characteristic in the fiber which can be measured using known techniques.

One method for monitoring a communications network cable is to use fibers that are internal to the protected cable. This so-called "intrinsic monitoring" is shown in U.S. Pat. No. 7,706,641 issued Apr. 27, 2010 to the present applicant, the disclosure of which is incorporated herein by reference.

The optical fibers can be monitored using a variety of detection techniques including:
  Modal metric, where changes in a modal power distribution in a multimode fiber are detected as shown in U.S. Pat. No. 7,092,586 issued Aug. 15, 2006 to the present applicant, the disclosure of which is incorporated herein by reference.
  Attenuation, where simply an attenuation in the monitoring signal received is measured.
  Optical Time Domain Reflectometer (OTDR) where reflections or localized attenuations from components of the fiber are detected.
  Distributed sensing (DAS/DSS/DTS):
    DAS—Distributed Acoustic Sensing where vibrations and displacements cause localized shifts in the path length of the optical fiber. This is detected by a high precision optical Time Domain Reflectometer (OTDR). This OTDR is often referred to as a Phase-OTDR or $\phi$-OTDR, and measures changes in the distance between points of Rayleigh backscatter.
    DSS—Distributed Strain Sensing—where strain is measured along a fiber due to tensile or compressive displacements, compression, or cracks. Typically measured using Brillouin OTDR, transmitted light and scattered light are mixed as a heterodyne receiver. This Brillouin frequency shift is proportional to strain and temperature in the fiber.
    DTS—Distributed Temperature Sensor—where temperature is measured along an optical fiber including by use of Raman OTDR. Light propagating down the fiber at two wavelengths cause Stokes and anti-Stokes light. The amplitude of light reflected back to the detector in a similar fashion to Rayleigh Backscattering in a traditional OTDR, is highly dependent on temperature. The ratio of Stokes and anti-Stokes light indicates temperature, while the round trip transit time indicates location. As with DSS, Brillouin OTDR can also be used to measure distributed temperature.
  Polarization monitoring, where changes in a polarization in the signal in a single mode fiber are detected as shown in U.S. Pat. No. 7,142,737 issued Nov. 28, 2006 to the present applicant, the disclosure of which is incorporated herein by reference.
  Active fiber monitoring, where monitoring signal and data signal pass on the same fibers as shown in U.S. Pat. No. 7,092,586 issued Aug. 15, 2006 to Vokey et al. and the present applicant, the disclosure of which is incorporated herein by reference.
  Strain monitoring such as strain gauge where a Fiber Bragg Grating, strain gauge or DSS monitors a fiber or mechanical structure, disturbance will be stretching or compression
  Interferometry such as the Mach-Zehnder interferometers used for network and perimeter monitoring. These may be zone based, or locating by use of bidirectional differential time of flight systems.

Each of these methods of monitoring exploit a specific attribute of the fiber—be it loss, rotation of state of polarization, Rayleigh scattering, or others.

In some cases a single fiber is monitored with typically the transmission at one end and the monitoring at the other or same end. However other arrangements can be used in the present invention including for example the loop type network shown for example in U.S. Pat. No. 7,142,737 issued Nov. 28, 2006 to the present applicant, the disclosure of which is incorporated herein by reference.

Often these systems are placed into service, but continued viability and availability should be verified. Accordingly an intelligent, automatic test is needed that does not interfere with or disrupt the actual performance of the monitoring fiber. The test should exercise the entire system, including perturbation detection, alarm generation, response to alarm, and alarm logging. Thus, it is desirable to create a controlled and characterized event on the monitor fiber structure itself to test the entire system and responses.

One existing arrangement for this function is provided by the StopLight (trademark) available from CyberSecure IMS. This test is implemented by passing the monitoring fiber in a secure network through an optical shutter that simply shuts off transmission of the light to the fiber. At the appropriate time, scheduled, spontaneous, or random, the optical shutter opens the circuit, causing the monitoring equipment to register an alarm. This method is accepted in the industry, although a shortcoming is that the monitoring is "blind" during this short period of testing. This adds the vulnerability of an inside threat, cognizant of the blind period, which could act to switch the monitored fibers with a substitute fiber or fiber pair. The system owners would then operate under the belief that the system was secure, although in fact it is no longer monitored.

SUMMARY OF THE INVENTION

According to the present invention there is provided a method for verifying operation of an optical fiber monitoring system comprising:
using a detection system to detect changes in an optical fiber caused by an event to be monitored by:
transmitting from a source of light at a transmit location a monitor signal along the optical fiber;
receiving the monitor signal after transmission along the fiber;
analyzing the monitor signal after transmission along the fiber to detect changes therein caused by the event to be monitored;
and generating an alarm in response to said detected changes which are indicative of an event;
and periodically checking proper operation of the optical fiber monitoring system by:
providing a fiber disturbance actuator to cause disturbance of a portion of the fiber at a predetermined location thereon where the disturbance is characteristic of an event to be monitored;
periodically operating the fiber disturbance actuator;
analyzing the monitor signal to detect changes therein caused by said fiber disturbance actuator;
and in the event that expected changes in response to said fiber disturbance actuator are not detected, actuating a warning that the intrusion detection system is not properly operating.

The fiber concerned can be used for transmission of data as a single transmission fiber or as part of a network. Alternatively, the fiber may be used for monitoring movement of or damage to the fiber as part of a perimeter or structure monitoring system where the signal is used to detect the movement or vibrations of the fiber as a part of an intrusion even into the area being monitored.

Preferably the fiber disturbance actuator generates a predetermined pattern of movements which can thus be recognized by a signature associated with the pattern.

Preferably the fiber disturbance actuator generates predetermined periodic displacements to the fiber typically at a predetermined frequency. These displacements can be formed in bursts of a series of spaced envelopes each containing predetermined periodic displacements to the fiber.

Preferably the fiber disturbance actuator generates a modulation frequency which is chosen to be out of band with ambient disturbances.

Preferably the fiber disturbance actuator generates a modulation frequency which provides a duty cycle defining the frequency bursts which is chosen to be dissimilar to natural occurrences.

Preferably the method includes analyzing the monitor signal and adjusting a magnitude of disturbance caused by the fiber disturbance actuator in response to the analysis. This will allow the amplitude of the perturbation to be adjusted to be appropriate to the magnitude of the monitor signal so that the amplitude must be high enough to be detected, but not so high as to interfere with the monitor signal processing. The adjustment can be controlled from any of several locations, including over a network from the monitor end of the fiber, or controlled locally such as a local network, manual adjustment, or serial connection.

The amplitude of the test perturbation can be monitored to detect fiber quality as insertion loss changes or the insertion of a fiber optic tap along the fiber.

The arrangement herein thus provides a system for applying a known disturbance or perturbation on a monitor fiber with the intention of being detected by the monitoring system.

This invention excites the fiber under very specific conditions in order to confirm that the fiber, cable, or structure is being monitored as expected.

In a preferred arrangement, the fiber being monitored includes or has connected as a part an input fiber length for isolation from the monitoring device of any connector reflections caused by connection of the fiber disturbance actuator. In many cases this includes also an exit fiber which again acts for isolation purposes. This isolation provided by the inlet and exit fiber portions is particularly important in the systems which rely on reflection techniques where any such reflections can be orders of magnitude greater than the signals to be detected.

This system including the inlet and exit isolation fiber portions is typically connected to a network and is instructed to commence a test. The internal fiber disturbance actuator is engaged in a pre-determined manner, the signal from which is then recognized by the monitoring device, which in turn registers the test as successful and proves that the fiber being monitored is connected and secure.

In a preferred embodiment, where the monitor equipment is of a type that determines location of the movement rather than simply the existence of the movement, the monitoring system acts to look for a specific location and for a specific signal signature. This will not only ensure the invention is still connected to the monitored fiber, and by applying detection to a very specific location on the fiber it ensures that a substitute fiber is not used to bypass the intended monitored cable.

This system satisfies a number of applications:

Under command from a communicating device such as a data network or serial port, the fiber disturbance actuator can be instructed to activate. When this activation is detected by the monitoring device, satisfaction of periodic health check of the monitoring system is satisfied. This test may be in satisfaction of a formal standard, or as good practice as defined by the user.

The fiber disturbance actuator may have a manual trigger such as a push button, causing a test to initiate. This test might occur immediately or after a predetermined or random time, adding confidence to the test.

The fiber disturbance actuator and the control system operating the actuator can in some cases be configured to initiate tests autonomously; where this might be scheduled or random in occurrence.

The fiber disturbance actuator may be used as a health monitor of the security system. In this embodiment, the control system can initiate a test at a predetermined frequency, verifying the system is functional.

The arrangement can perform periodic connectivity test to confirm the intended fiber is being monitored.

As cited above in U.S. Pat. No. 7,706,641, fiber security products, such as the Interceptor (trademark) product from Network Integrity Systems perform a fiber monitoring function that is zone based. Rather than pinpoint a location, these devices utilize a loop of fiber, and monitor the entire continuous loop as one zone. The arrangement herein is applicable for zone use as well. The fiber disturbance function of the fiber disturbance actuator acts similarly to a location determining product.

BRIEF DESCRIPTION OF THE DRAWINGS

FIG. 5 is a block diagram showing a system of the present invention installed as a far end implementation using a separate dedicated monitoring fiber in a data transmission cable.

FIGS. 6 and 7 show sample bursts of cyclical disturbances arranged in envelopes which provide a specified signature of period and frequency which allows the monitoring device to identify the applied movements from the fiber disturbance actuator.

FIG. 8 shows schematically one example of a fiber disturbance actuator using a motor for physically moving one part of the fiber relative to another.

FIG. 10 shows schematically one example of a fiber disturbance actuator which uses a motor to bend one portion of the fiber relative to another.

DETAILED DESCRIPTION

Figure 1:
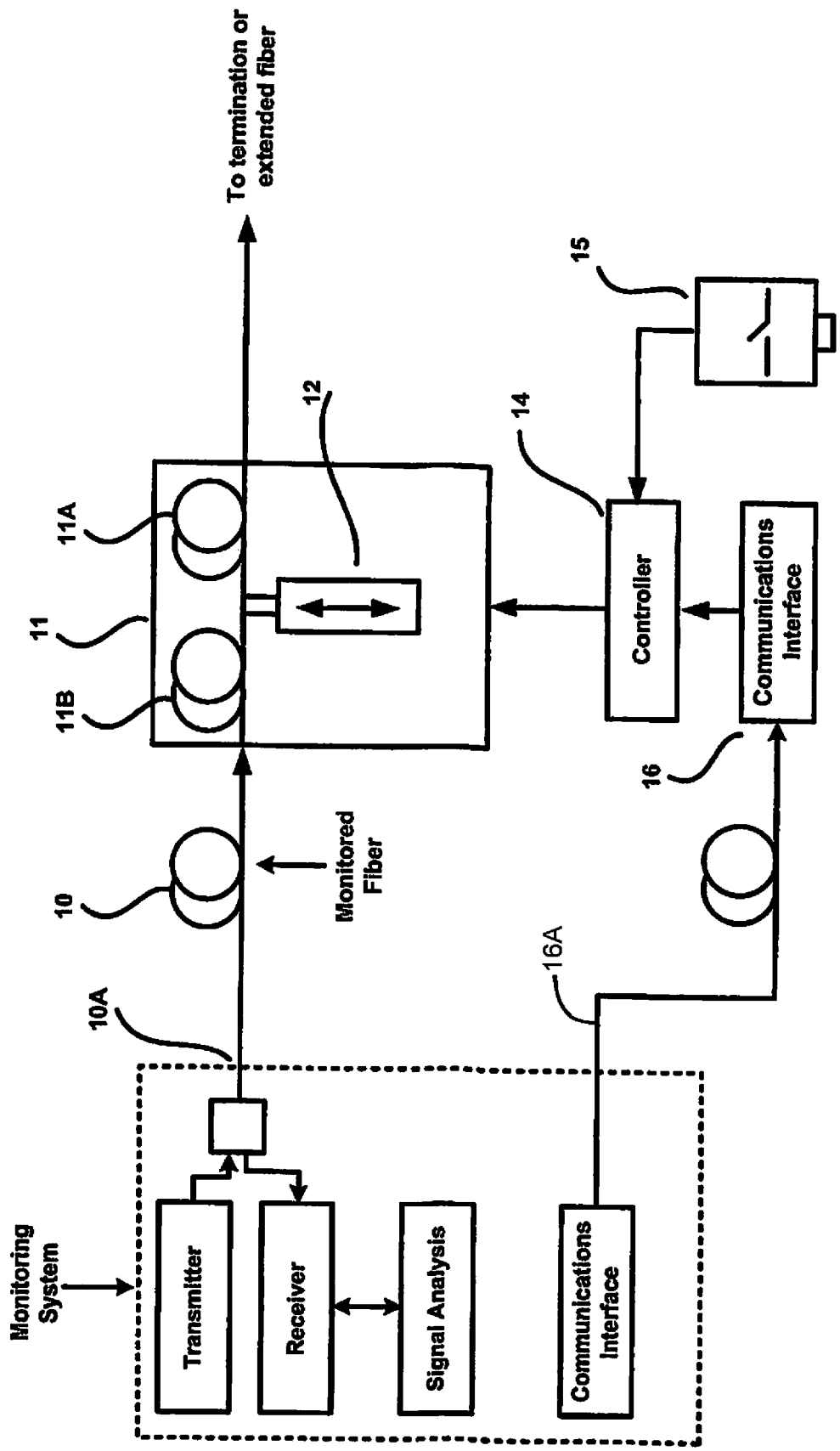
FIG. 1 is a block diagram showing a system of the present invention installed in a fiber to be monitored by inlet and exit isolation fibers.

As shown in FIG. 1 there is provided a fiber 10 including connector 10A which provides an input from a monitoring device such as a fiber optic security system. An isolating fiber portion 11 including inlet and exit portions 11A, 11B is connected into the fiber 10 and acts to displace the main monitored section of the fiber from the monitoring device. A fiber disturbance generator 12 is mounted in the isolating fiber portion and is controlled by a controller 14. This causes an input disturbance of a predetermined signature and magnitude, as discussed hereinafter, on the portion of the fiber 10 which is being monitored by the monitoring device.

The controller 14, which can be actuated by a switch 15 or by a communications interface 16, from the monitoring system acts for causing the fiber disturbance generator to generate the characteristic disturbance signature with the required magnitude of disturbance.

The communications interface acts to allow the monitor system to initiate a test. The mechanical switch can be used by a system operating person for generating an autonomous test.

Figure 3:
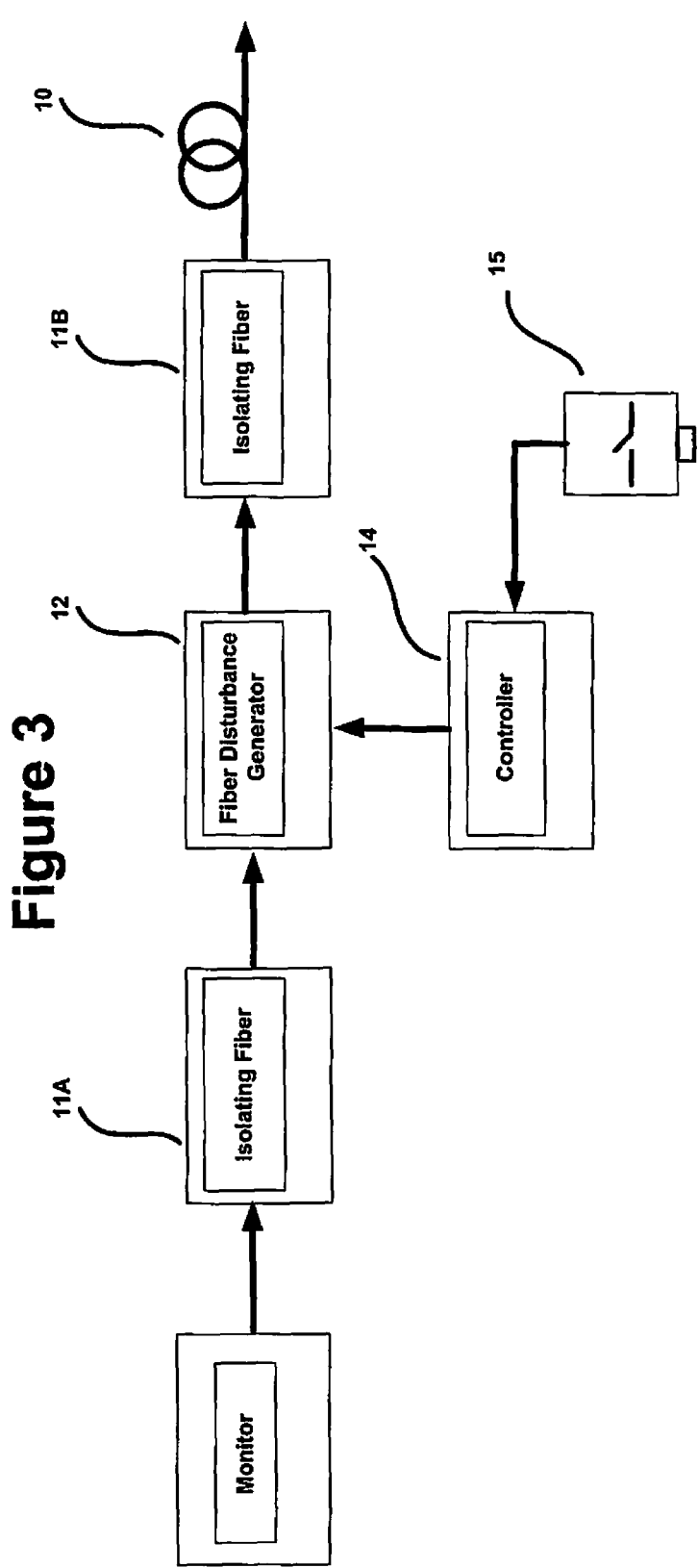
FIG. 3 is a block diagram showing a system of the present invention installed as a near end connection in a data transmission fiber to be monitored using inlet and exit isolation fibers.

In FIG. 3 an installation is provided of the fiber disturbance actuator system including the actuator and the isolation fiber portions at the near end of the fiber is shown. This consists of the system monitor, such as a Distributed Acoustic Sensor interrogator as discussed above. This detects the characteristic disturbance signature introduced by the fiber disturbance generator. As this type of monitoring system is very sensitive to reflections, the isolating fiber isolates the fiber disturbance generator from the reflections caused by the connection to the monitor. Also the isolation fiber portions act to allow recovery from any deadzone effect of the monitor. For example, any monitor utilizing optical time domain reflectometry (OTDR) exhibits a "deadzone" at the front panel, causing it to be blind to events immediately after the connection. The internal isolating fiber eliminates that issue since in effect the dead zone is moved into the isolation fiber area.

The output isolating fiber portion 11B, like the input isolating fiber portion 11A, allows for isolation from the front connector. It also allows the system to be connected bidirectionally. The output of this output fiber portion is connected to the fiber 10 to be protected. The controller section causes the fiber disturbance generator 12 to generate the required signature and amplitude for detection.

The optional external switch 15 can be activated to cause the controller to cause a test to be performed under control of the system operating personnel, that is, without prior instruction from other equipment in the control system.

Figure 2:
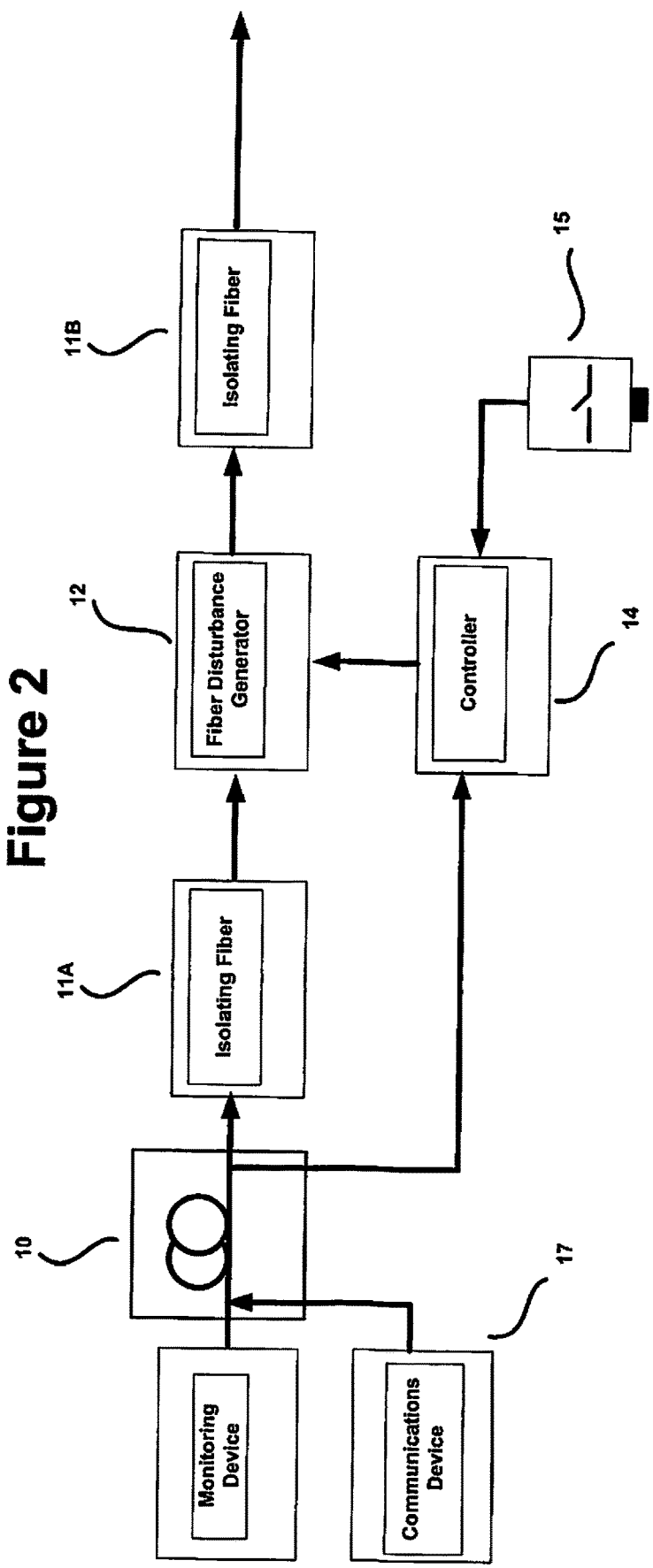
FIG. 2 is a block diagram showing a system of the present invention installed as a far end connection in a data transmission fiber to be monitored using inlet and exit isolation fibers.

FIG. 2 shows a version of the invention which is similar to the FIG. 3 with the differentiation that it is intended to be installed at the far end of the fiber, or at any location remote from the near end where power is available. The addition of a communication device 17 connected to a communication medium such as the shown fiber is used to send instructions such as a request for test to the controller and a feedback from the monitor system concerning the amplitude of the disturbances. This has the added benefit of testing the far end of the cable or at a location remote from the near end, which enhances assurance of security.

Figure 4:
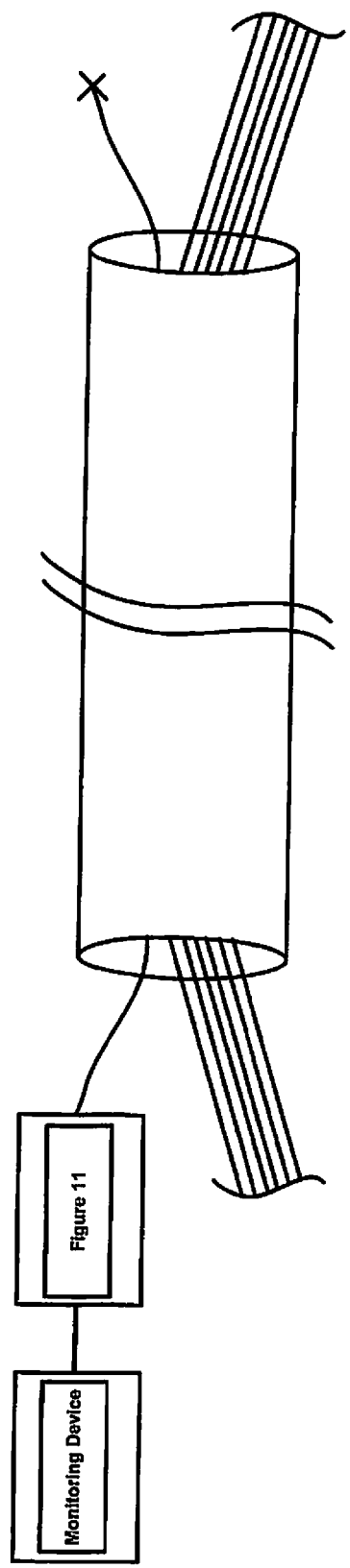
FIG. 4 is a block diagram showing a system of the present invention installed as a near end implementation using a separate dedicated monitoring fiber in a data transmission cable.

FIG. 4 illustrates the monitor fiber which intrinsically protects all the fibers in the cable by utilizing a spare fiber in the cable.

FIG. 5 illustrates an embodiment that utilizes a pair of available fibers in a cable: one for monitoring and one for communications between the monitoring device and the near end equipment. This is a preferred embodiment where a system can be installed on spare fibers in a cable adding connectivity assurance as well as health tests and periodic testing to the cable monitor.

FIGS. 6 and 7 show typical patterns P1, P2 and P3 of fiber displacement where the fiber disturbance actuator generates a series of spaced envelopes of signal bursts each containing predetermined periodic displacements to the fiber. In FIG. 7, the frequency of the bursts in the pattern P2 is increased relative to that of FIG. 6 and the period of the bursts is decreased. It will be appreciated that various patterns can be generated to create a signature pattern to be detected by the monitoring system. Preferably the frequency of the pulses is chosen to be out of band with ambient disturbances. Preferably the modulation frequency provides a duty cycle defining the frequency bursts which is chosen to be dissimilar to natural occurrences which can be expected from machine learning so that the signature pattern can be readily determined during the test process. This can include repetitive duty cycle such as 50:50. The duty cycle defining the frequency bursts may be a complex keyed code for security. This can be changed periodically, randomly, on a scheduled basis, or triggered by a coded or uncoded message or by detectable amplitude changes to the envelope as shown in pattern P3.

In FIG. 7 the last pulses in pattern P3 are shown at reduced amplitude which is determined by analysis of the received monitoring signals so that the amplitude matches a requirement to provide signals which are large enough to be identified and not so large that they interfere with the normal monitoring process by having changes which are beyond those which are expected and are measurable.

When used for near end applications, system can be implemented with only the first isolation fiber, which is provided between the monitoring device and actuator device.

When used for the far end application, system is implemented with both input and output fibers as a method for isolating the actuator signal from reflections.

The system with input and output fiber spools can be used either near end or far end, and is bidirectional in that it can be optically connected in either direction.

It will be appreciated that the type of disturbance used by the system actuator is selected to match the technology of the monitoring device; thus for example:

In a modal metric detection system, the actuator typically uses a disturbance device which acts to bend or physical move a portion of the fiber.

In an attenuation detection system, the actuator typically uses a disturbance device which acts to bend the fiber.

In an Optical Time Domain Reflectometer detection system, the actuator typically uses a disturbance device which acts to bend the fiber.

In a Distributed sensing (DAS/DSS/DTS) detection system, the actuator typically uses a disturbance device which acts to create changes in the monitor signal which can be detected by this type of monitoring system.

In a Distributed Acoustic Sensing (DAS) detection system, the actuator typically uses a disturbance device which acts to move the fiber in a shaking or vibrating action.

In a Strain monitoring system such as strain gauge detection system or a Distributed Strain Sensing system (DSS), the actuator 12 shown in FIG. 1 typically uses a disturbance device which acts to stretch or compress the fiber.

In a Distributed Temperature Sensing (DTS) detection system, the actuator 12 in FIG. 1 typically uses a disturbance device which acts to heat or cool the fiber.

In a Polarization detection system, the actuator typically uses a disturbance device which acts to bend or shake the fiber, or mechanically rotate the state of polarization such as by moving, shaking, or vibrating paddles which introduce birefringence by changing stress on the fiber by way of bending or rotating.

In an Interferometery detection system, the actuator typically uses a disturbance device which acts to bend or shake the fiber.

As an alternative an active area of actuator can contain a fiber Bragg grating, in which the actuator acts to heat, bend, or stretch the grating.

The communications interface may contain a dual wavelength/single fiber ethernet connection 16A. When used with a single fiber monitor, a two fiber solution will protect a cable. When installing optical cables, it is common practice to install cables with more fiber than is needed for the immediate or foreseeable future. As the bulk of the price of an installation is labor, and the price difference when upgrading the fiber count is incremental, unused (called "dark") fiber are often available. As networks most often utilize 2 fibers each, one for transmit and one for receive, and as fiber count in cables is typically an even number, often a multiple of 6 or 12, there are often pairs of optical fibers that are available for use. Single fiber monitoring systems, such as DAS, will utilize one fiber in a pair while leaving the other available for communication. Single fiber communications standards, such as Ethernet, provide full duplex communication over a single fiber by transmitting one wavelength, such as 1310 nm, in one direction, and another wavelength such as 1550 nm in the opposite direction. Combining the single fiber monitoring with the single fiber communication provides a complete instance of this invention on a pair of fibers. Single fiber communications solutions can also be achieved by techniques such as differing modulation frequencies, states of polarizations, time division multiplexing, and others.

Similarly, the communications might be realized by use of multiple fibers, such as two. Monitoring and communications functions can be performed over the same fiber pair(s) by use of wavelength division multiplexing, time division multiplexing, or other multiplexing schemes.

Zone based non-locating monitoring methods are often implemented over two fibers, or a fiber loop. Use of multiplexing methods such as wavelength division multiplexing, time division multiplexing, or other multiplexing schemes can be utilized to share the fibers between the monitoring and the communication systems.

CW detecting monitoring devices, such as zone type network or perimeter protection devices can detect the frequency with a frequency detecting method.

This method can be a hardware phase locked loop within the receiver circuitry of the monitoring equipment. In this embodiment, a disturbance of known frequency is generated while frequency detection equipment such as a phase locked loop is used for detection, which registers a successful test.

This method can be a software phase locked loop. Similar to the hardware phase locked loop within the receiver circuitry of the monitoring equipment, a detection algorithm is used within the signal processing software. In this embodiment, a disturbance of known frequency is generated while frequency detection algorithm emulating a phase locked loop is used for detection, which registers a successful test.

This method can be bandpass filters. Similar to the hardware phase locked loop within the receiver circuitry of the monitoring equipment, a hardware or software frequency filter can suppress all frequencies except that of the disturbance generator. In this embodiment, a disturbance of known frequency is generated while detection equipment detects the signal passed through the bandpass filter, which registers a successful test.

This method can be Fourier Transforms. The spectra of a received signal can be inspected for the presence of the disturbance frequency. In this embodiment, a disturbance of known frequency is generated while detection equipment detects the signal as a spectral spike of sufficient amplitude, which registers a successful test.

This method can be correlation, including Wavelet Transforms. The spectra of a received signal can be inspected for the presence of the disturbance frequency. In this embodiment, a disturbance consisting of a pulse, chirp, wavelet, or other finite signal of known composition is generated while detection equipment detects the signal and applies correlation or Wavelet Transform to detect the presence of the disturbance, which registers a successful test.

Zone based products may multiplex communication signal and monitor signal on the same fiber pair by using wavelength division multiplexers. Zone based systems may be configured for single mode or multimode fiber.

A system as described, but used for zone-based non-location determining systems, can omit the internal isolations fiber portions as reflections and dead zones are not of concern.

For vibration sensing monitoring sensors, the active device disturbing the fiber within the disturbance generator may be of several technologies, including but not limited to:

Electromagnetic actuators which cause displacement by energizing a coil or other electromagnetic device. This might include attaching a fiber to a moving portion of a voice coil As Electromagnetic actuators which cause displacement by coating by depositing or other technique a sensitive material to the fiber and placing it within the field with no other moving parts.

The fiber disturbance device 12 shown in FIG. 1 can use a Piezo-electric actuator attached to the fiber and causing the vibration The fiber disturbance device 12 shown in FIG. 1 can use a Haptic actuator such as the rotating motor type Mechanical such as rotating cam or sawtooth The fiber disturbance device 12 shown in FIG. 1 can use a an arrangement where the fiber is displaced by placing it between stators within an electrostatic field, and varying the field to displace the fiber Variable optical attenuator: perturbation is a variation in optical signal amplitude Variable polarization controller: perturbation is variation in optical signal polarization Variable optical mode mixing: use a mode mixer to change modal fill of optical signal in MMF fiber, causing a perceived perturbation in our products In the described system, a fiber Bragg grating may be used within the disturbance generator. When perturbed, detectable wavelength shifts are detected.

In systems that determine distance or location, the detection signature should occur at a predetermined location, representative of the installation. This precise location thwarts attempts to spoof the system by bypassing with a separate fiber. This attempted spoofing might, at the fiber patch panel or other convenient locations, replace the connections to the monitored cable with a fiber. Requiring a precise fiber length and event location significantly eliminates that ability.

The disturbance repetition rate, frequency, or combination of these and other parameters may be arranged to be representative of a unique key.

The system may be placed at the beginning, end, or any location along the path of the fiber where electrical power is available.

The device is preferably arranged to produce a heartbeat at a configurable, identifiable frequency and cadence that the monitoring interrogator can reliably interpret as a unique event.

When operating in periodic mode the device can be configured with a cryptographic key to communicate time based one-time passwords (TOTP) during tests. This can be used to prove the identity of the test device to the sensing device. The password can be encoded by the content of the test signal. The password can be encoded by the timing of the test. In this way, devices operating in the above time based one-time password mode can be used not just for testing the sensing system, but for providing evidence that that sensing cable has not been bypassed. Devices operating in periodic mode only without network access may be battery powered.

The disturbance Generator will have an adjustable magnitude which will allow perturbation to be adjusted to be appropriate to the magnitude of the monitor signal. The amplitude must be high enough to be detected, but not so high as to interfere with signal processing. This may be controlled from any of several locations, including over a network from the monitor end of the fiber, or controlled locally such as a local network, manual adjustment, or serial connection.

FIG. 8 shows schematically one example of a fiber disturbance actuator using a motor 30 operating a rotating cam 31 for moving one part of the fiber relative to another part which is held fixed by an anchor 32.

Figure 9B:
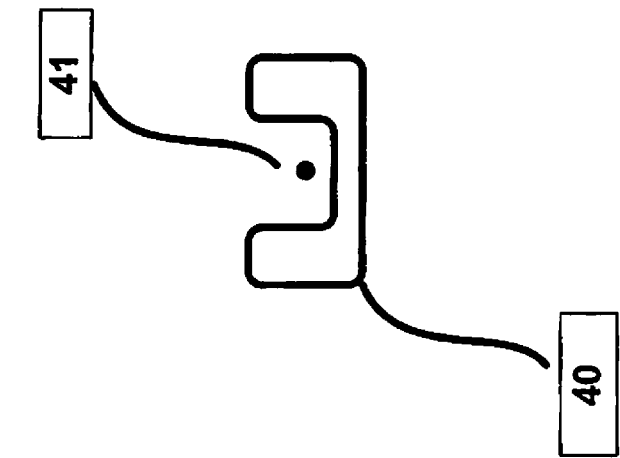
FIGS. 9A and 9B show schematically in side and end view respectively one example of a fiber disturbance actuator using an electromagnetic field to physically move a fiber portion which is coated with a material responsive to the field.
Figure 9A:
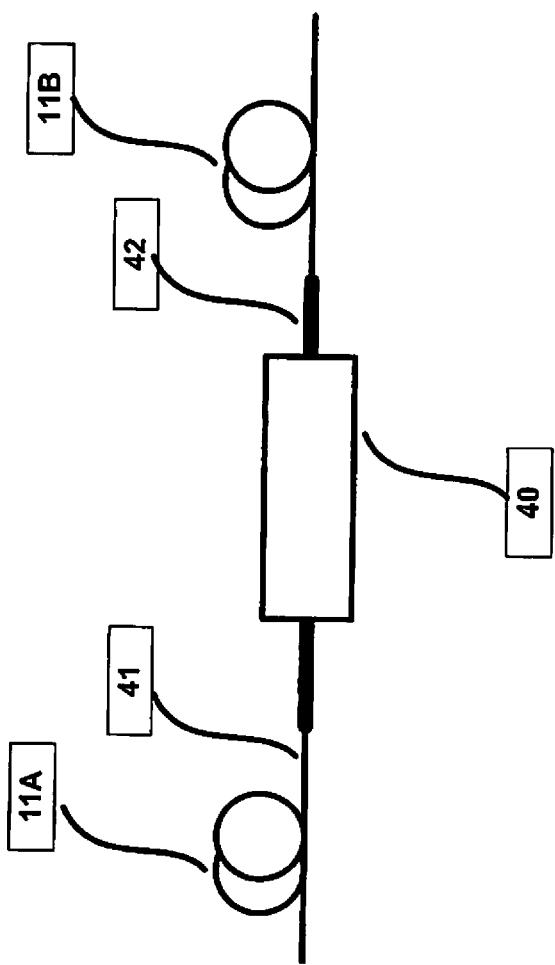

FIGS. 9A and 9B show schematically one example of a fiber disturbance actuator using an electromagnetic field generator 40 to physically move a fiber portion 41 which is coated with a material 42 responsive to the field.

FIG. 10 shows schematically one example of a fiber disturbance actuator which uses a motor 50 to bend one portion of the fiber relative to another.

Figure 11:
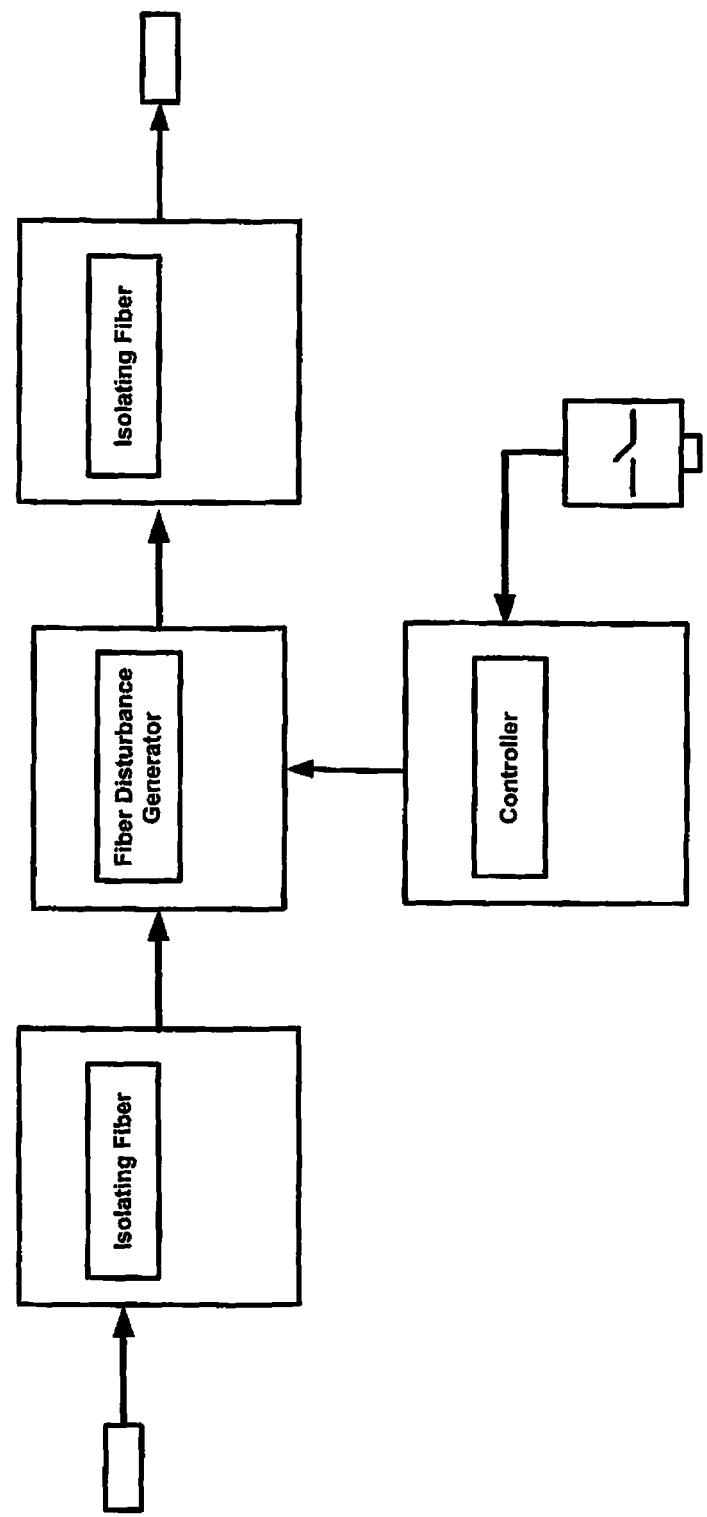
FIG. 11 is a schematic illustration of the operating components which form the elements of the invention for attachment to the fiber to be monitored.

FIG. 11 shows schematically the components herein. Switch 18 represents a mechanical input device which, when actuated, initiates a test or a sequence that leads to the performance of a test. This can also represent other types of interfaces such as contact closures and/or other interfaces to allow the test device to send notifications when certain activities happen in and around the device; i.e. door closures or equipment cabinet openings. Signatures generated by the test device can communicate notifications of inputs at the test device, and report to the monitoring device.

The invention claimed is:

1. A method for verifying operation of an optical fiber monitoring system comprising:
    using a detection system to detect changes in an optical fiber caused by an event to be monitored by:
        transmitting from a source of light at a transmit location a monitor signal along the optical fiber;
        receiving the monitor signal after transmission along the optical fiber;
        analyzing the monitor signal after transmission along the optical fiber to detect changes therein caused by the event to be monitored;
        and generating an alarm in response to said detected changes which are indicative of the event;
    and repeatedly checking proper operation of the optical fiber monitoring system by:
        providing a fiber disturbance actuator to cause at least one disturbance of a portion of the optical fiber at a predetermined location thereon;
        repeatedly operating the fiber disturbance actuator;

wherein the fiber disturbance actuator is arranged to produce said at least one disturbance at a configurable, identifiable frequency and cadence which provides a recognizable signature;
analyzing the monitor signal to detect changes therein caused by said fiber disturbance actuator;
and when expected changes in response to said at least one disturbance having said recognizable signature from said fiber disturbance actuator are not detected, actuating a warning that the detection system is not properly operating.

2. The method according to claim 1 wherein the fiber disturbance actuator generates a predetermined pattern of disturbances of said at least one disturbance.

3. The method according to claim 1 wherein the fiber disturbance actuator generates disturbances of said at least one disturbance at a predetermined frequency.

4. The method according to claim 1 wherein the fiber disturbance actuator generates a series of spaced envelopes each containing disturbances of said at least one disturbance.

5. The method according to claim 1 wherein the fiber disturbance actuator generates a pattern of disturbances of said at least one disturbance defining said recognizable signature.

6. A method for verifying operation of an optical fiber monitoring system comprising:
using a detection system to detect changes in an optical fiber caused by an event to be monitored by:
transmitting from a source of light at a transmit location a monitor signal along the optical fiber;
receiving the monitor signal after transmission along the optical fiber;
analyzing the monitor signal after transmission along the optical fiber to detect changes therein caused by the event to be monitored;
and generating an alarm in response to said detected changes which are indicative of the event;
and repeatedly checking proper operation of the optical fiber monitoring system by:
providing a fiber disturbance actuator to cause at least one disturbance of a portion of the optical fiber at a predetermined location thereon where said at least one disturbance is characteristic of the event to be monitored;
repeatedly operating the fiber disturbance actuator;
analyzing the monitor signal to detect changes therein caused by said fiber disturbance actuator;
and when expected changes in response to said fiber disturbance actuator are not detected, actuating a warning that the detection system is not properly operating,
wherein the fiber disturbance actuator generates disturbances of said at least one disturbance at a modulation frequency which is chosen to be out of band with ambient disturbances.

7. A method for verifying operation of an optical fiber monitoring system comprising:
using a detection system to detect changes in an optical fiber caused by an event to be monitored by:
transmitting from a source of light at a transmit location a monitor signal along the optical fiber;
receiving the monitor signal after transmission along the optical fiber;
analyzing the monitor signal after transmission along the optical fiber to detect changes therein caused by the event to be monitored;
and generating an alarm in response to said detected changes which are indicative of the event;
and repeatedly checking proper operation of the optical fiber monitoring system by:
providing a fiber disturbance actuator to cause at least one disturbance of a portion of the optical fiber at a predetermined location thereon where said at least one disturbance is characteristic of the event to be monitored;
repeatedly operating the fiber disturbance actuator;
analyzing the monitor signal to detect changes therein caused by said fiber disturbance actuator;
and when expected changes in response to said fiber disturbance actuator are not detected, actuating a warning that the detection system is not properly operating;
wherein the fiber disturbance actuator generates disturbances of said at least one disturbance at a modulation frequency which provides a duty cycle defining frequency bursts which is chosen to be dissimilar to natural occurrences.

8. The method according to claim 1 including analyzing the monitor signal and adjusting a magnitude of said disturbances of said at least one disturbance caused by the fiber disturbance actuator in response thereto.

9. A method for verifying operation of an optical fiber monitoring system comprising:
using a detection system to detect changes in an optical fiber caused by an event to be monitored by:
transmitting from a source of light at a transmit location a monitor signal along the optical fiber;
receiving the monitor signal after transmission along the optical fiber;
analyzing the monitor signal after transmission along the optical fiber to detect changes therein caused by the event to be monitored;
and generating an alarm in response to said detected changes which are indicative of the event;
and repeatedly checking proper operation of the optical fiber monitoring system by:
providing a fiber disturbance actuator to cause at least one disturbance of a portion of the optical fiber at a predetermined location thereon where said at least one disturbance is characteristic of the event to be monitored;
repeatedly operating the fiber disturbance actuator;
analyzing the monitor signal to detect changes therein caused by said fiber disturbance actuator;
and when expected changes in response to said fiber disturbance actuator are not detected, actuating a warning that the detection system is not properly operating,
wherein the optical fiber includes an input fiber length isolating the fiber disturbance actuator from the detection system.

10. The method according to claim 9 wherein the input fiber length is used for near end applications.

11. The method according to claim 9 wherein there is provided an output isolating fiber which isolates a front connector and a main portion of the optical fiber from the input fiber length.

12. The method according to claim 11 wherein the output isolating fiber connects the fiber disturbance actuator to the main portion of the optical fiber bidirectionally.

13. The method according to claim 1 wherein the detection system determines location of the event on the optical fiber and wherein the monitor signal is analyzed to determine a specific location on the optical fiber of the fiber disturbance actuator.

14. The method according to claim 13 wherein the determination of the specific location ensures that the fiber disturbance actuator is still connected to the optical fiber, and that a substitute optical fiber is not used to bypass the optical fiber.

15. The method according to claim 1 wherein a communicating device is provided for causing operation of the fiber disturbance actuator.

16. The method according to claim 1 wherein a manual trigger is provided for causing operation of the fiber disturbance actuator where the manual trigger causes the operation immediately or after a predetermined or random time.

17. The method according to claim 1 wherein operation of the fiber disturbance actuator is caused autonomously; where the operation can be scheduled or random in occurrence.

18. The method according to claim 1 wherein a communications interface communicates with the fiber disturbance actuator using a dual wavelength/single fiber ethernet connection.

19. The method according to claim 1 wherein the detection system comprises a zone network or a perimeter protection device which detects the frequency with a frequency detecting method.

20. The method according to claim 1 wherein the fiber disturbance actuator operates to cause said disturbances of said at least one disturbance of the optical fiber by any one or more of bending, shaking, heating, cooling, compressing or stretching the optical fiber.

21. A method for verifying operation of an optical fiber monitoring system comprising:
  using an detection system to detect changes in an optical fiber caused by an event to be monitored by:
    transmitting from a source of light at a transmit location a monitor signal along the optical fiber;
    receiving the monitor signal after transmission along the optical fiber;
    analyzing the monitor signal after transmission along the optical fiber to detect changes therein caused by the event to be monitored;
    and generating an alarm in response to said detected changes which are indicative of the event;
  and repeatedly checking proper operation of the optical fiber monitoring system by:
    providing a fiber disturbance actuator to cause at least one disturbance of a portion of the optical fiber at a predetermined location thereon where said at least one disturbance is characteristic of the event to be monitored;
    repeatedly operating the fiber disturbance actuator;
    analyzing the monitor signal to detect changes therein caused by said fiber disturbance actuator;
    and when expected changes in response to said fiber disturbance actuator are not detected, actuating a warning that the detection system is not properly operating;
  wherein the fiber disturbance actuator operates to cause said at least one disturbance by physical movement of the portion of the fiber by energizing an electromagnetic device.

22. The method according to claim 21 wherein the fiber disturbance actuator operates to cause said at least one disturbance by physical movement of the optical fiber by coating a sensitive material to the portion of the optical fiber and placing it within a field.

23. The method according to claim 21 wherein the fiber disturbance actuator is arranged to produce said at least one disturbance of said portion of the optical fiber by any one or more of bending, shaking, compressing or stretching the portion of the optical fiber.

24. The method according to claim 21 wherein a recognizable signature is applied to the fiber by the fiber disturbance actuator by varying a disturbance repetition rate, a disturbance frequency, or combination of these.

25. The method according to claim 21 wherein the fiber disturbance actuator has a manual trigger.

26. The method according to claim 21 wherein the fiber disturbance actuator is actuated by a self-initiate test at a scheduled or random time.

* * * * *